(12) United States Patent
Shiao et al.

(10) Patent No.: US 8,443,947 B2
(45) Date of Patent: May 21, 2013

(54) MAGNETO-RHEOLOGICAL FLUID DAMPER

(75) Inventors: Yaojung Shiao, Taipei (TW); Yao-Kuan Huang, Taipei (TW)

(73) Assignee: National Taipei University of Technology (TW)

( * ) Notice: Subject to any disclaimer, the term of this patent is extended or adjusted under 35 U.S.C. 154(b) by 60 days.

(21) Appl. No.: 13/299,846

(22) Filed: Nov. 18, 2011

(65) Prior Publication Data

US 2012/0211316 A1    Aug. 23, 2012

(30) Foreign Application Priority Data

Feb. 22, 2011    (TW) .............................. 100105767 A

(51) Int. Cl.
*F16F 9/53*    (2006.01)

(52) U.S. Cl.
USPC ................................. 188/267.2; 188/322.22

(58) Field of Classification Search
USPC ........................ 188/267, 267.1, 267.2, 322.22
See application file for complete search history.

(56) References Cited

U.S. PATENT DOCUMENTS

| | | | | |
|---|---|---|---|---|
| 6,481,546 B2 * | 11/2002 | Oliver et al. | ............... | 188/267.1 |
| 7,775,333 B2 * | 8/2010 | Or et al. | ................... | 188/267.2 |
| 8,051,961 B2 * | 11/2011 | Azekatsu et al. | .......... | 188/267.2 |
| 2009/0277733 A1 * | 11/2009 | Doffing | ...................... | 188/267.2 |
| 2012/0211315 A1 * | 8/2012 | Shiao et al. | ................ | 188/267.2 |

* cited by examiner

*Primary Examiner* — Bradley King

(74) *Attorney, Agent, or Firm* — Schmeiser, Olsen & Watts, LLP

(57) ABSTRACT

A magneto-rheological fluid damper includes a housing, a magnetically permeable body, a spindle, and a magneto-rheological fluid. Given a plurality of multi-pole two-way magnetic poles and a plurality of multi-pole coils, magnetic lines pass through the magneto-rheological fluid mostly in a direction perpendicular to a gap, such that the magneto-rheological fluid features an enhanced chaining force. Accordingly, the magneto-rheological fluid damper enables an increase in a magnetically permeable area of the magneto-rheological fluid subjected to an applied magnetic field and enhancement of damping force, and is free from a complete system failure.

12 Claims, 5 Drawing Sheets

MAGNETO-RHEOLOGICAL FLUID DAMPER

CROSS-REFERENCE TO RELATED APPLICATION

This non-provisional application claims priority under 35 U.S.C.§119(a) on Patent Application No(s).100105767 filed in Taiwan, R.O.C. on Feb. 22, 2011, the entire contents of which are hereby incorporated by reference.

FIELD OF TECHNOLOGY

The present invention relates to magneto-rheological fluid dampers, and more particularly, to a magneto-rheological fluid damper effective in enlarging the area of magnetic permeability of a magneto-rheological fluid under an applied magnetic field to increase a damping force and preventing a complete failure of the damping force.

BACKGROUND

A magneto-rheological fluid (MRF) is a smart material being developed. Under an applied magnetic field, solid magnetizable particles in a magneto-rheological fluid are in chainlike alignment with magnetic lines connected between the north pole and the south pole and thus produce resistance to a shear stress.

Although a conventional magneto-rheological fluid damper is advantageously characterized by controllability and swift changeability of the damping force, the prior art has its own drawbacks. The design of the magnetically permeable blocks and a single coil which are disposed inside the conventional magneto-rheological fluid damper leads to a relatively small area of the effective chaining taking place in magneto-rheological fluids and thereby results in a relatively small damping force. Also, when severed, the single coil causes a complete failure of the controllability of the damper and a great reduction in the damping force.

Referring to FIG. 1, there is shown a cross-sectional view of a conventional magneto-rheological fluid damper 9. As shown in the drawing, the magneto-rheological fluid damper 9 comprises a housing 91, a spindle 92, a damping block 93, a coil 94, and a magneto-rheological fluid 95. The spindle 92 and the damping block 93 are connected to each other and slidingly disposed in the housing 91. The coil 94 is wound around the damping block 93 to generate an applied magnetic field. The magneto-rheological fluid 95 is uniformly distributed in the gap between the damping block 93 and the housing 91.

Nonetheless, the damping block 93 and the housing 91 account for the area of the reach of the resistance force generated by the magneto-rheological fluid damper 9. A simulation clearly reveals that magnetic lines (as indicated by arrows shown in FIG. 1) pass mostly through small areas over and under the area of the reach of the resistance force, and in consequence the magnetic field at the central portion of the area of the reach of the resistance force is weak. Hence, the effective chaining of the magneto-rheological fluid 95 is limited mostly to the small areas over and under the area of the reach of the resistance force. The limited area of the effective chaining of the magneto-rheological fluid 95 results in the small area of the reach of a shear force arising from the magneto-rheological effect, thereby limiting the resistance force generated by the magneto-rheological fluid damper 9.

Furthermore, the performance of the magneto-rheological fluid damper 9 depends on the coil 94 which is wound around the damping block 93. Assuming that the coil 94 is damaged or severed, the coil 94 can no longer generate an applied magnetic field, thereby resulting in a complete failure of the damping force.

Accordingly, it is imperative to devise a magneto-rheological fluid damper which is effective in enlarging the area of magnetic permeability of a magneto-rheological fluid under an applied magnetic field to increase a damping force and preventing a complete failure of the damping force.

SUMMARY

In view of the shortcomings of the conventional magneto-rheological fluid damper, the inventor of the present invention conducted extensive researches and experiments according to the inventor's years of experience in the related industry, and finally developed a magneto-rheological fluid damper which is effective in enlarging the area of magnetic permeability of a magneto-rheological fluid under an applied magnetic field to increase a damping force and preventing a complete failure of the damping force.

It is a primary objective of the present invention to provide a magneto-rheological fluid damper which comprises a plurality of multi-pole two-way magnetic poles and a plurality of multi-pole coils whereby magnetic lines pass through a magneto-rheological fluid mostly in a direction perpendicular to a gap to thereby enable the magneto-rheological fluid to generate a stronger chaining force, enlarge the area of magnetic permeability of a magneto-rheological fluid under an applied magnetic field to increase a damping force, and prevent a complete failure of the damping force.

In order to achieve the above and other objectives, the present invention provides a magneto-rheological fluid damper, comprising: a housing having an inner wall and an inner receiving chamber; a magnetically permeable body axially slidable within the inner receiving chamber and separable from the inner wall by a gap, the magnetically permeable body comprising an upper lid, a lower lid, an inner magnetic body, a non-magnetically permeable separating ring, an outer magnetic body, and a plurality of magnetically permeable rods, wherein the inner magnetic body, the non-magnetically permeable separating ring, and the outer magnetic body are arranged in a radial order and disposed between the upper lid and the lower lid, wherein the inner magnetic body and the non-magnetically permeable separating ring are spaced apart from each other by a spacing, the non-magnetically permeable separating ring adjoins the outer magnetic body, wherein the magnetically permeable rods are isometrically and radially arranged within the spacing, wherein each of the magnetically permeable rods has an end connected to the inner magnetic body and another end penetrating the non-magnetically permeable separating ring to connect with the outer magnetic body, wherein a coil is wound around each of the magnetically permeable rods; a spindle disposed at the upper lid and configured to protrude out of the housing and slide axially within the inner receiving chamber together with the magnetically permeable body; and a magneto-rheological fluid for filling the inner receiving chamber.

The magneto-rheological fluid damper comprises a plurality of multi-pole two-way magnetic poles and a plurality of multi-pole coils whereby magnetic lines pass through a magneto-rheological fluid mostly in a direction perpendicular to a gap to thereby enable the magneto-rheological fluid to generate a stronger chaining force, enlarge the area of magnetic permeability of a magneto-rheological fluid under an applied magnetic field to increase a damping force, and prevent a complete failure of the damping force.

BRIEF DESCRIPTION OF THE DRAWINGS

To enable persons skilled in the art to fully understand the objectives, features, and advantages of the present invention, the present invention is hereunder illustrated with specific embodiments in conjunction with the accompanying drawings, in which.

DETAILED DESCRIPTION

Figure 1:
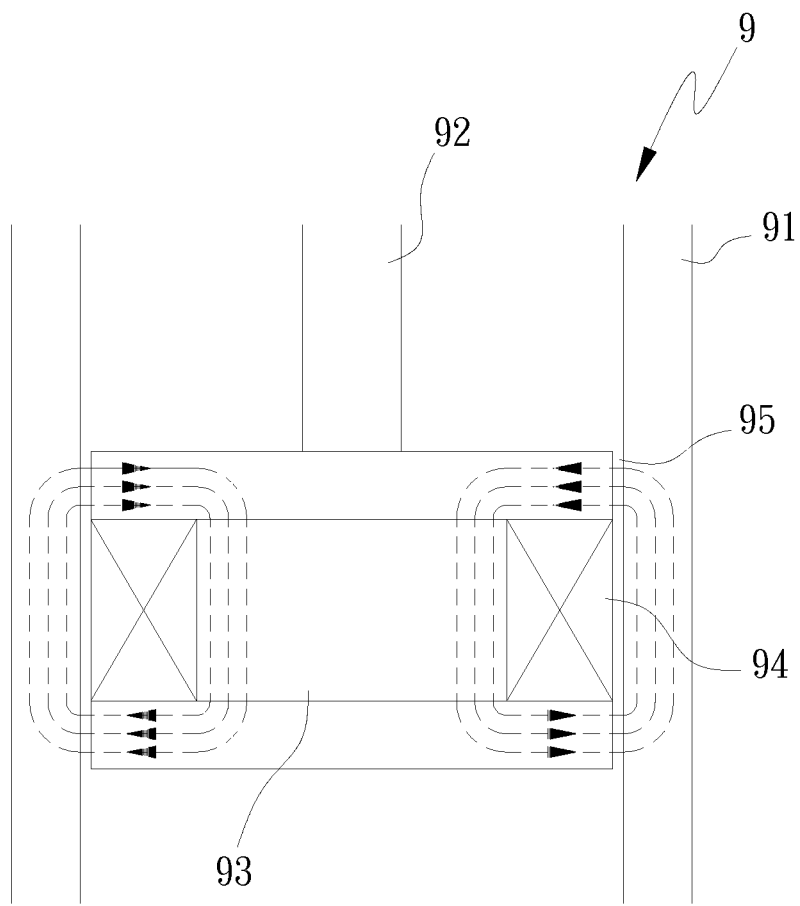
FIG. 1 is a cross-sectional view of a conventional magneto-rheological fluid damper.
Figure 2:
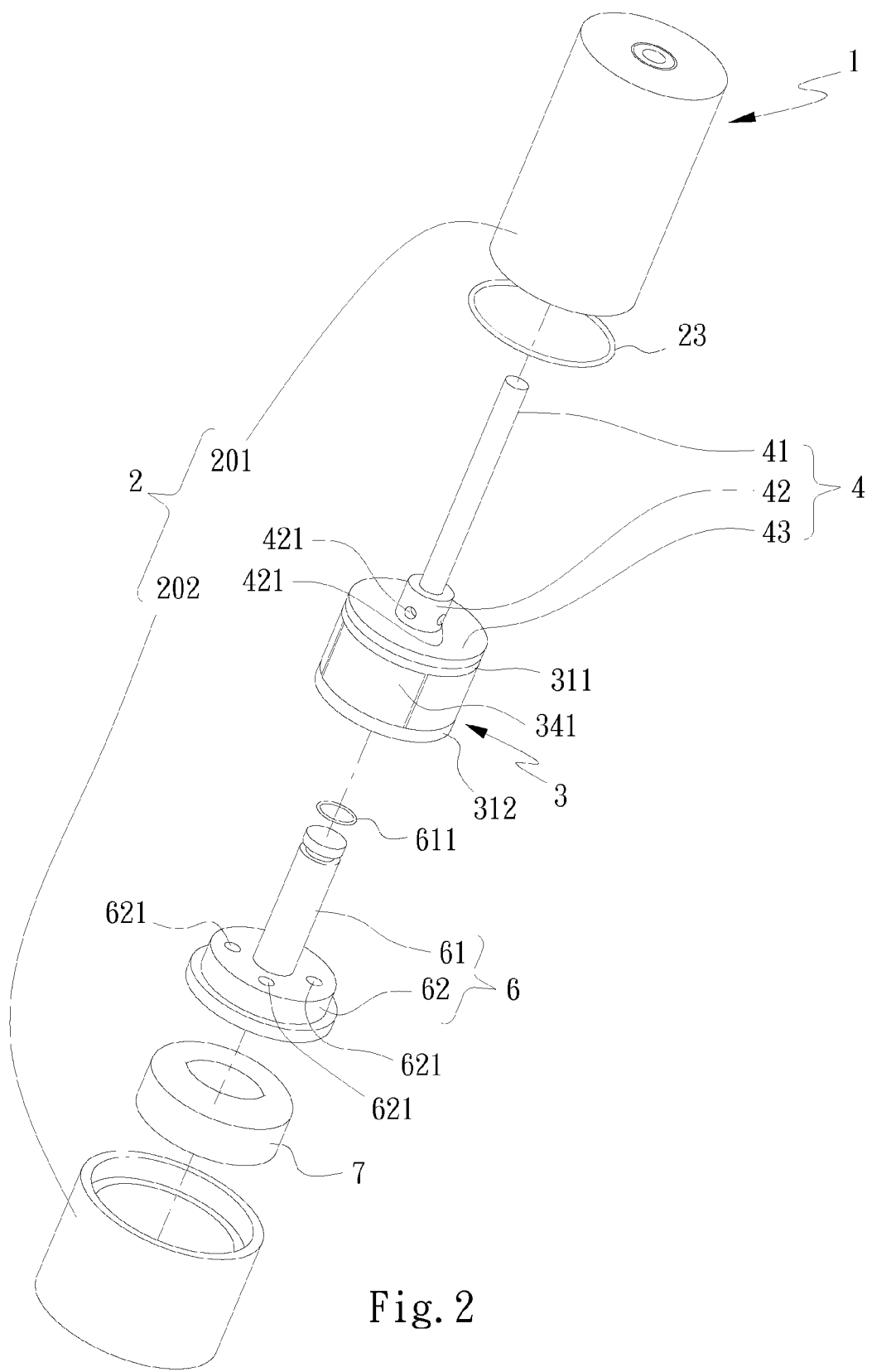
FIG. 2 is an exploded view of a magneto-rheological fluid damper according to an embodiment of the present invention.

Referring to FIG. 2, there is shown an exploded view of a magneto-rheological fluid damper 1 according to an embodiment of the present invention. As shown in the drawing, the magneto-rheological fluid damper 1 comprises a housing 2, a magnetically permeable body 3, a spindle 4, and a magneto-rheological fluid 5 (shown in FIG. 5).

Figure 3:
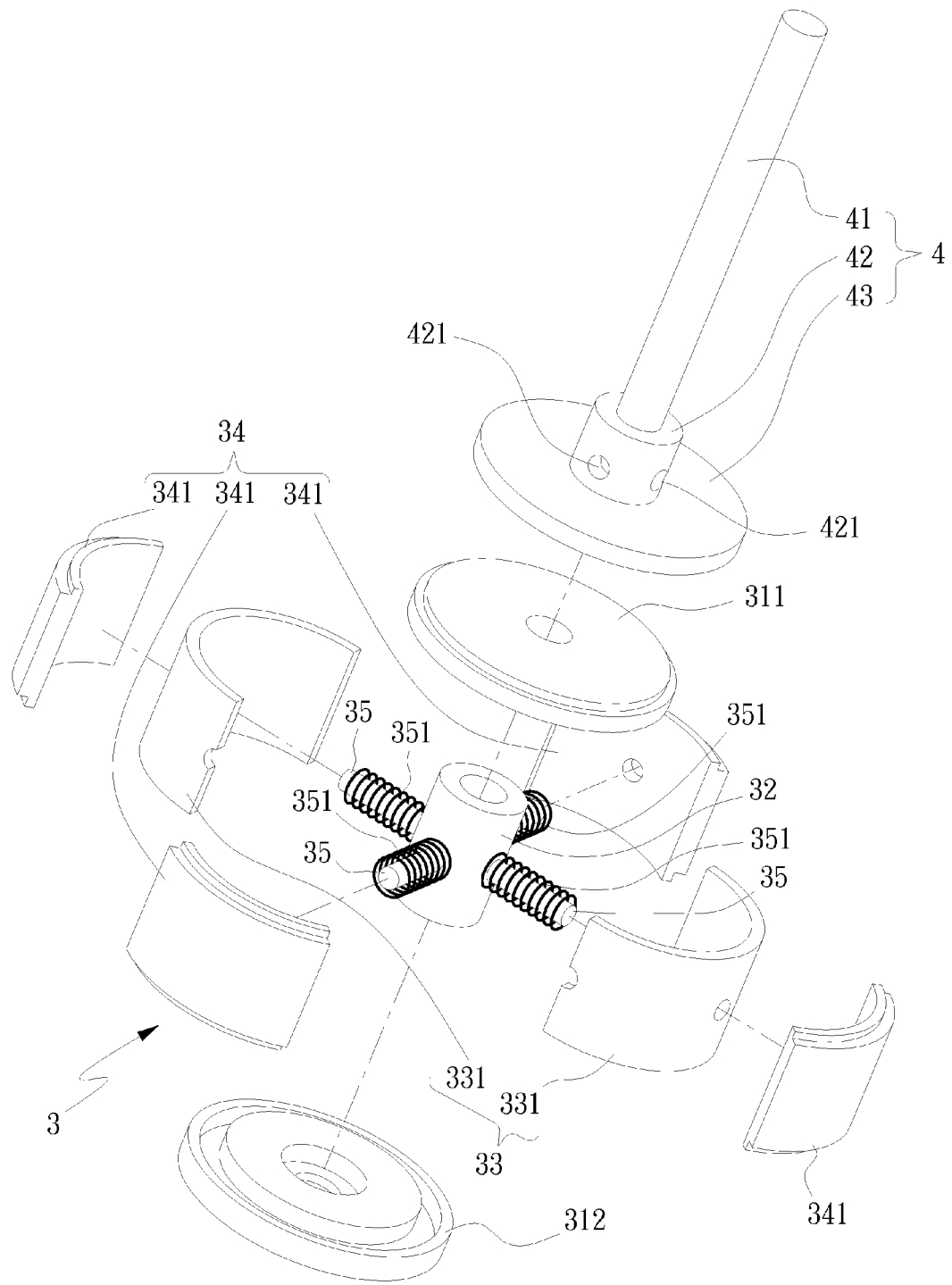
FIG. 3 is an exploded view of a magnetically permeable body and a spindle according to an embodiment of the present invention.
Figure 4:
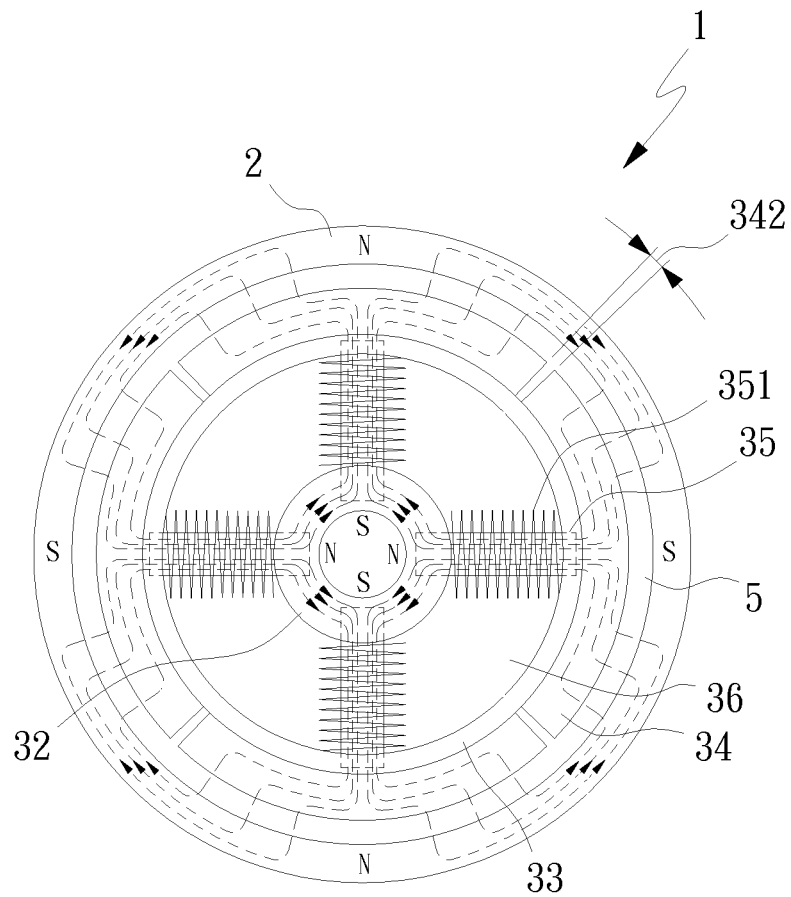
FIG. 4 is a transverse cross-sectional view of the magneto-rheological fluid damper according to an embodiment of the present invention.
Figure 5:
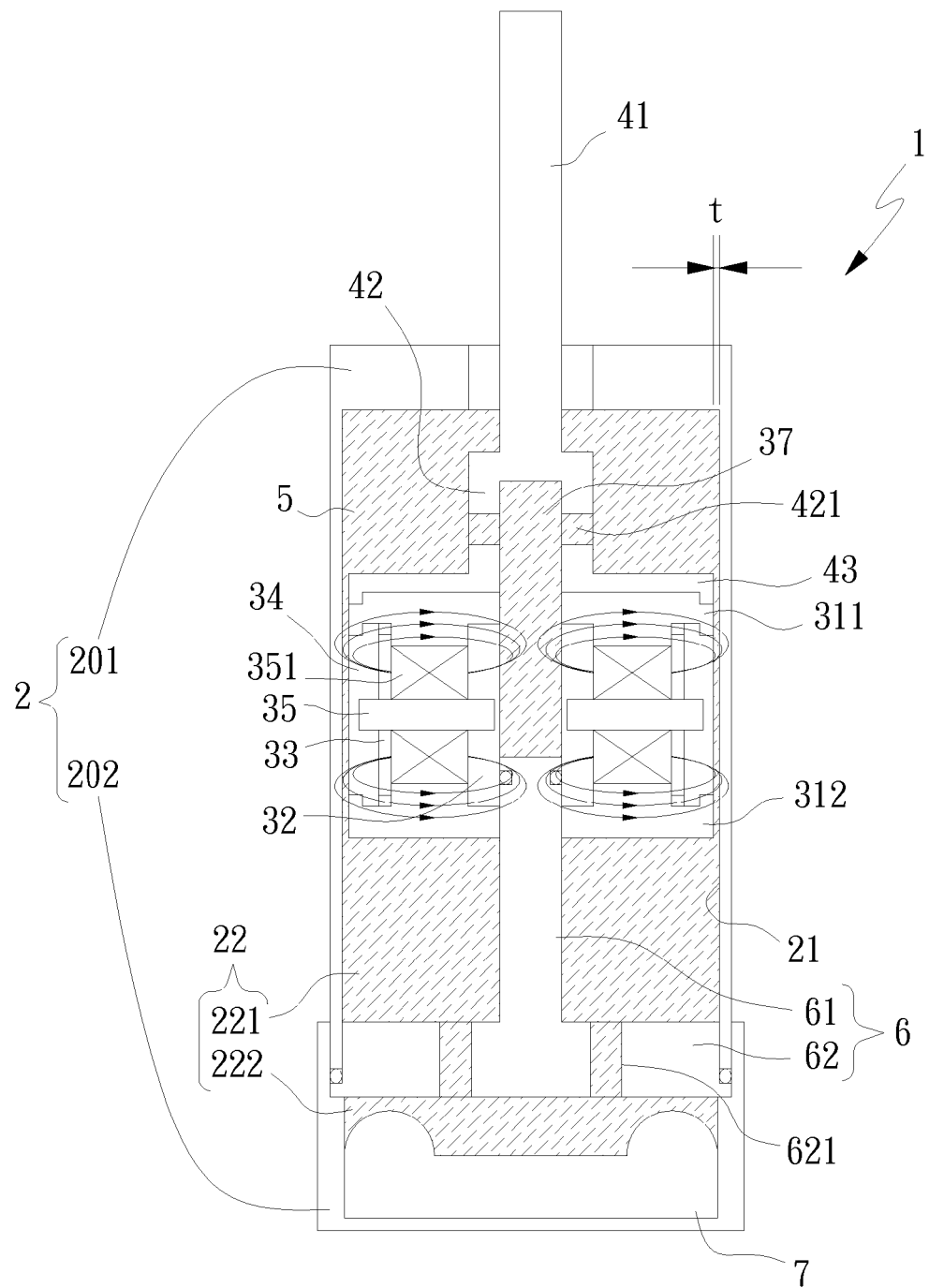
FIG. 5 is a longitudinal cross-sectional view of the magneto-rheological fluid damper according to an embodiment of the present invention.

FIG. 3 is an exploded view of the magnetically permeable body 3 and the spindle 4 according to an embodiment of the present invention. FIG. 4 is a transverse cross-sectional view of the magneto-rheological fluid damper 1 according to an embodiment of the present invention. FIG. 5 is a longitudinal cross-sectional view of the magneto-rheological fluid damper 1 according to an embodiment of the present invention.

As shown in the drawings, the housing 2 comprises an upper casing 201 and a lower casing 202 coupled together. Also, the housing 2 has an inner wall 21 and an inner receiving chamber 22. An O-ring 23 is disposed between the upper casing 201 and the lower casing 202 to prevent a leak. The magnetically permeable body 3 is axially slidable within the inner receiving chamber 22 of the housing 2 and separable from the inner wall 21 by a gap t. The magnetically permeable body 3 comprises an upper lid 311, a lower lid 312, an inner magnetic body 32, a non-magnetically permeable separating ring 33, an outer magnetic body 34, and a plurality of magnetically permeable rods 35.

As shown in the drawings, the inner magnetic body 32, the non-magnetically permeable separating ring 33, and the outer magnetic body 34 of the magnetically permeable body 3 are arranged in a radial order and disposed between the upper lid 311 and the lower lid 312. The inner magnetic body 32 and the non-magnetically permeable separating ring 33 are spaced apart from each other by a spacing 36. The non-magnetically permeable separating ring 33 adjoins the outer magnetic body 34. The magnetically permeable rods 35 are isometrically and radially arranged within the spacing 36. Each of the magnetically permeable rods 35 has one end which is connected to the inner magnetic body 32 and the other end which penetrates the non-magnetically permeable separating ring 33 to connect with the outer magnetic body 34. A coil 351 is wound around each of the magnetically permeable rods 35.

As shown in the drawings, the spindle 4 has an upper rod portion 41, a middle perforated portion 42, and a lower disk portion 43. The free end of the upper rod portion 41 of the spindle 4 protrudes out of the housing 2. A plurality of through holes 421 radially penetrates the middle perforated portion 42 of the spindle 4. The lower disk portion 43 of the spindle 4 is coupled to the upper lid 311 of the magnetically permeable body 3. The spindle 4 is slidable axially within the inner receiving chamber 22 together with the magnetically permeable body 3. The inner receiving chamber 22 of the housing 2 is filled with the magneto-rheological fluid 5.

The magneto-rheological fluid damper 1 further comprises a directing shaft 6 and a gas storage chamber 7. The directing shaft 6 and the gas storage chamber 7 are disposed in the inner receiving chamber 22 of the housing 2.

To be specific, the directing shaft 6 has a guiding axle 61 and a disk 62. The guiding axle 61 is disposed at the disk 62 and protrudes therefrom axially and upward. The magnetically permeable body 3 has an axial passage 37 which penetrates the upper lid 311, the inner magnetic body 32, and the lower lid 312. The guiding axle 61 moves relative to the magnetically permeable body 3 by sliding along the axial passage 37. An O-ring 611 is disposed at the top end of the guiding axle 61 to prevent the magneto-rheological fluid 5 from passing between the guiding axle 61 and the axial passage 37. Under the guidance of the guiding axle 61 of the directing shaft 6, the spindle 4 is unlikely to deviate from its course while sliding axially within the inner receiving chamber 22 of the housing 2 together with the magnetically permeable body 3.

The disk 62 is confined to the housing 2 by the inner wall 21 thereof and configured to divide the inner receiving chamber 22 into an upper inner receiving chamber 221 and a lower inner receiving chamber 222. A plurality of vias 621 penetrate the disk 62 to enable communication between the upper inner receiving chamber 221 above the disk 62 and the lower inner receiving chamber 222 below the disk 62. The gas storage chamber 7 is disposed in the lower inner receiving chamber 222. Furthermore, the gas storage chamber 7 is a deformable structure, such that the capacity of the gas storage chamber 7 is variable as a result of the deformation of the gas storage chamber 7.

The inner magnetic body 32 is a hollow cylinder. The non-magnetically permeable separating ring 33 consists of two hemispherical non-magnetically permeable separating ring units 331 which are coupled together. The outer magnetic body 34 consists of four C-shaped outer magnetic body units 341 which are coupled together. Adjacent ones of the outer magnetic body units 341 are separated by an opening 342 (shown in FIG. 4). In an embodiment, the magnetically permeable body 3 has a total of four said magnetically permeable rods 35.

The magneto-rheological fluid 5 that fills the inner receiving chamber 22 of the housing 2 can only flow for two coexisting reasons: first, the axial sliding of the spindle 4 within the inner receiving chamber 22; second, the through holes 421 of the spindle 4 and the vias 621 of the disk 62 of the directing shaft 6. In addition, the gas storage chamber 7, which is of a deformable structure and thereby variable capacity, serves to minimize the fluctuation of the pressure of the magneto-rheological fluid 5 when the magneto-rheological fluid 5 flows from the upper inner receiving chamber 221 to the lower inner receiving chamber 222 (due to the axial sliding of the spindle 4 within the inner receiving chamber 22).

Hence, the magneto-rheological fluid damper 1 comprises a plurality of multi-pole two-way magnetic poles and a plurality of multi-pole coils (a plurality of magnetically permeable rods 35 and the coil 351 wound around the magnetically permeable rods 35), such that magnetic lines (as indicated by arrows shown in FIG. 4 and FIG. 5) pass through the magneto-rheological fluid 5 mostly in a direction perpendicular to a gap to thereby enable the magneto-rheological fluid 5 to generate a stronger chaining force, enlarge the area of magnetic permeability of the magneto-rheological fluid 5 under an applied magnetic field to increase a damping force, and prevent a complete failure of the damping force.

In conclusion, the magneto-rheological fluid damper of the present invention is characterized in that:

1. a magneto-rheological fluid functions as an internal fluid medium of a controllable and variable viscosity coefficient such that a damping force of the magneto-rheological fluid damper is under control;

2. the magneto-rheological fluid damper can operate without any motor-driven or hydraulic mechanical driver such that the absence of any mechanically activating component enables the damping force to change quickly in the course of a real-time control process of the damping force;

3. the magneto-rheological fluid damper of the present invention differs from a conventional magneto-rheological fluid damper in terms of structure, because the magneto-rheological fluid damper of the present invention comprises an inner magnetic body which is surrounded by magnetic poles and coils;

4. a plurality of multi-pole two-way magnetic poles, an innovative feature of the present invention, greatly increases the area of the effective chaining taking place in the magneto-rheological fluid;

5. the plurality of multi-pole magnetic poles are arranged in a manner that the magnetic poles alternate between different directions, that is, adjacent magnetic poles are of opposite directions and thus capable of generating magnetic paths in a plurality of directions, which not only shortens the distance traveled by each of the magnetic paths and reduces magnetic reluctance, but increases the area of the reach of the magnetic lines;

6. the area of the chaining caused by the magneto-rheological fluid damper to the magneto-rheological fluid is maximized; and 7. the replacement of a single coil by a plurality of multi-pole coils prevents a complete failure of the controllability of the magneto-rheological fluid damper even when the single coil severs.

The above embodiments of the magneto-rheological fluid damper of the present invention merely serve an illustrative purpose; hence, for example, the magneto-rheological fluid damper of the present invention can be varied as follows:

1. the number of the poles of a plurality of multi-pole magnetic poles is subject to changes and is not necessarily an even number; however, a magnetic path simulation reveals that a magnetic force is optimized when the number of the poles of the multi-pole magnetic poles is an even number, preferably four, as described in the aforesaid embodiments;

2. it is feasible for the outer magnetic body units to be coupled together to form a unitary unit of a circular shape, and it is feasible for each said outer magnetic body unit not to be of an elongated arch-shaped configuration as disclosed in the present invention; and, an optimization simulation reveals that a magnetic force is optimized when each of the outer magnetic body units is of an elongated arch-shaped configuration, as described in the aforesaid embodiments; and 3. it is feasible for the inner magnetic body not to be a hollow cylinder; for example, the inner magnetic body can work well even if it comprises a plurality of inner magnetic body units; in other words, four variant embodiments of the aforesaid inner and outer magnetic body units of the magneto-rheological fluid damper are as follows: severed outer magnetic body units and connected inner magnetic body units; severed outer magnetic body units and severed inner magnetic body units; connected outer magnetic body units and severed inner magnetic body units; and connected outer magnetic body units and connected inner magnetic body units; as described in the aforesaid embodiments, severed outer magnetic body units and connected inner magnetic body units bring about the preferred magnetic force and thus are most suitable for use in a magneto-rheological fluid damper.

Hence, the present invention meets the three requirements of patentability, namely novelty, non-obviousness, and industrial applicability. Regarding novelty and non-obviousness, the present invention discloses a plurality of multi-pole two-way magnetic poles and a plurality of multi-pole coils, such that magnetic lines pass through a magneto-rheological fluid mostly in a direction perpendicular to a gap, and thus the magneto-rheological fluid features an enhanced chaining force. Accordingly, the magneto-rheological fluid damper enables an increase in a magnetically permeable area of the magneto-rheological fluid subjected to an applied magnetic field and enhancement of damping force, and is free from a complete system failure. Regarding industrial applicability, products derived from the present invention meet market demands fully.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A magneto-rheological fluid damper, comprising:
a housing having an inner wall and an inner receiving chamber;
a magnetically permeable body axially slidable within the inner receiving chamber and separable from the inner wall by a gap, the magnetically permeable body comprising an upper lid, a lower lid, an inner magnetic body, a non-magnetically permeable separating ring, an outer magnetic body, and a plurality of magnetically permeable rods, wherein the inner magnetic body, the non-magnetically permeable separating ring, and the outer magnetic body are arranged in a radial order and disposed between the upper lid and the lower lid, wherein the inner magnetic body and the non-magnetically permeable separating ring are spaced apart from each other by a spacing, the non-magnetically permeable separating ring adjoins the outer magnetic body, wherein the magnetically permeable rods are isometrically and radially arranged within the spacing, wherein each of the magnetically permeable rods has an end connected to the inner magnetic body and another end penetrating the non-magnetically permeable separating ring to connect with the outer magnetic body, wherein a coil is wound around each of the magnetically permeable rods;
a spindle disposed at the upper lid and configured to protrude out of the housing and slide axially within the inner receiving chamber together with the magnetically permeable body; and a magneto-rheological fluid for filling the inner receiving chamber.

2. The magneto-rheological fluid damper of claim 1, further comprising a directing shaft disposed in the inner receiving chamber and having a guiding axle protruding axially and upward, wherein the magnetically permeable body has an axial passage which penetrates the upper lid, the inner magnetic body, and the lower lid such that the magnetically permeable body moves relative to the guiding axle while the guiding axle slides along the axial passage.

3. The magneto-rheological fluid damper of claim 2, wherein the directing shaft further has a disk, and the guiding axle is disposed at the disk.

4. The magneto-rheological fluid damper of claim 3, wherein the disk is confined to the housing by the inner wall thereof, configured to divide the inner receiving chamber into an upper inner receiving chamber and a lower inner receiving chamber, and penetrated by at least a via for communication between the upper inner receiving chamber and the lower inner receiving chamber.

5. The magneto-rheological fluid damper of claim 4, further comprising a gas storage chamber disposed in the lower inner receiving chamber.

6. The magneto-rheological fluid damper of claim 1, wherein the inner magnetic body is a hollow cylinder.

7. The magneto-rheological fluid damper of claim 1, wherein the non-magnetically permeable separating ring comprises two hemispherical non-magnetically permeable separating ring units coupled together.

8. The magneto-rheological fluid damper of claim 1, wherein the outer magnetic body comprises a plurality of C-shaped outer magnetic body units coupled together.

9. The magneto-rheological fluid damper of claim 8, wherein the outer magnetic body units number four.

10. The magneto-rheological fluid damper of claim 8, wherein adjacent ones of the outer magnetic body units are separated by an opening.

11. The magneto-rheological fluid damper of claim 1, wherein the magnetically permeable rods number four.

12. The magneto-rheological fluid damper of claim 1, wherein at least a through hole penetrates an upper lid-connected end of the spindle radially.

* * * * *